United States Patent [19]
Hayakawa et al.

[11] Patent Number: 5,331,491
[45] Date of Patent: Jul. 19, 1994

[54] HIGH-DENISTY MAGNETIC RECORDING AND REPRODUCING HEAD

[75] Inventors: Masatoshi Hayakawa, Miyagi; Yasunari Sugiyama, Tokyo; Koichi Aso, Kanagawa, all of Japan

[73] Assignee: Sony Corporation, Tokyo, Japan

[21] Appl. No.: 847,923

[22] Filed: Mar. 9, 1992

[30] Foreign Application Priority Data

Mar. 7, 1991 [JP] Japan ................. 3-041811

[51] Int. Cl.⁵ ............................................. G11B 5/127
[52] U.S. Cl. ................................. 360/110; 360/111
[58] Field of Search ................ 360/110, 111–113, 360/123, 124, 125, 126

[56] References Cited

U.S. PATENT DOCUMENTS

| | | | |
|---|---|---|---|
| 4,091,429 | 5/1978 | Ate de Jouge et al. | 360/110 |
| 4,464,691 | 8/1984 | Sawazaki et al. | 360/111 |
| 4,530,016 | 7/1985 | Sawazaki | 360/134 X |
| 4,575,777 | 3/1986 | Hosokawa | 360/110 X |
| 4,677,512 | 6/1987 | Akiyama et al. | 360/110 |

FOREIGN PATENT DOCUMENTS

| | | | |
|---|---|---|---|
| 0132852 | 2/1985 | European Pat. Off. | 360/110 |
| 584739 | 9/1933 | Fed. Rep. of Germany | 360/110 |

*Primary Examiner*—John H. Wolff
*Attorney, Agent, or Firm*—Hill, Steadman & Simpson

[57] ABSTRACT

A magnetic recording and reproducing head records a signal from and reproduces a signal from a magnetic recording medium having a perpendicularly magnetizable film. The magnetic recording and reproducing head includes a magnetic sensing section comprising a slender needle of a soft magnetic material, and an exciting coil wound around the slender needle for magnetizing the slender needle to record a signal on the magnetic recording medium. To reproduced the recorded signal, high-frequency electric energy is applied to the magnetic sensing section to produce a reflected wave, and a change in the reflected wave caused by a leakage magnetic field produced by a signal recorded on the magnetic recording medium is detected as representing the recorded signal.

8 Claims, 5 Drawing Sheets

TO HIGH-FREQUENCY OSCILLATOR 3

OSC

HIGH-DENISTY MAGNETIC RECORDING AND REPRODUCING HEAD

BACKGROUND OF THE INVENTION

1. Field of the Invention

The present invention relates to a high-density magnetic recording and reproducing head for recording high-density information on and reproducing high-density information from a magnetic recording medium.

2. Description of the Prior Art

There have been developed magnetic recording mediums with high coercive forces to meet demands for high-density magnetic recording of desired information. Perpendicular magnetic recording has been proposed which employs a magnetic recording medium with perpendicular magnetic anisotropy.

Thin-film magnetic recording and reproducing heads have been developed for achieving narrower recording tracks and shorter wavelengths. The tendency in the field of magnetic recording and reproducing heads is being shifted from bulk heads toward thin-film heads.

Another developing effort has been directed to a thin-film magnetic head based on the magnetoresistive (MR) effect that is dedicated for reproducing recorded signals. The thin-film magnetic head does not depend on the relative speed between the magnetic head itself and a magnetic recording medium, the relative speed being lower as the density of recorded signals is higher. The MR magnetic head has an MR magnetic sensing section composed of a thin film of Permalloy. There has not been developed a material having a large MR effect, i.e., a sufficiently large ratio $\Delta R/R$ of a resistance change $\Delta R$ caused when a magnetic field is applied to a resistance R when no magnetic field is applied. The ratio $\Delta R/R$ of the Permalloy is of a small value of 2%.

Recently, there has been proposed an active magnetic head which utilizes a change in the inductance of a coil under an external magnetic field (see, for example, the lecture preprint No. 5, page 35, for the spring national convention of Electronic Information Communication Society, 1990).

The applicant has proposed a microwave waveguide type magnetic detecting device capable of reproducing, with high sensitivity, a signal magnetic field produced by a signal magnetically recorded on a magnetic recording medium, as disclosed in Japanese patent application No. 3-333687.

As shown in FIG. 1 of the accompanying drawings, the disclosed magnetic detecting device is embodied as a magnetic reproducing head comprising a microwave waveguide 2 positioned at a terminal end thereof and including a soft magnetic material 1 whose magnetic permeability varies due to an external magnetic field applied, and a high-frequency oscillator 3 for oscillating the microwave waveguide 2.

A magnetic field to be detected, i.e., a signal magnetic field produced by a signal magnetically recorded on a magnetic recording medium 4, is applied to the soft magnetic material 1. The magnetic permeability of the soft magnetic material 1 varies when the applied magnetic field varies. When the magnetic permeability of the soft magnetic material 1 varies, the impedance of the microwave waveguide 2 varies, resulting in a change in the reflectivity of the high-frequency electric energy supplied to the microwave waveguide 2. The change in the reflectivity of the supplied high-frequency electric energy results in a voltage change at a certain location in the microwave waveguide 2, which is measured as the change in the applied external field.

The principle of operation of the microwave waveguide type magnetic reproducing head will further be described below. When a microwave waveguide which is not matched at a load end thereof is oscillated by high-frequency electric energy supplied through a microwave transmission line such as a coaxial cable, a reflected wave as well as a traveling wave exist in the waveguide, producing a standing wave resulting from the overlapping reflected and traveling waves. The amplitude ratio of the standing wave is maximum in those microwave waveguides whose load end is open or short-circuited.

FIG. 2 of the accompanying drawings shows the magnitude $|V|$ of a standing wave in the microwave waveguide 2 whose load end is open. The solid-line curve shown in FIG. 2 indicates that a standing wave exists whose amplitude $|V|$ is minimum at $x=x_0$. In FIG. 2, the ratio of the maximum amplitude to the minimum amplitude of the standing wave is referred to as a voltage standing wave ratio, and $\lambda$ indicates a distance or pitch between adjacent two of repetitive cycles of the standing wave.

The voltage standing wave ratio and the pitch $\lambda$ depend on the magnetic permeability B in the waveguide. When the magnetic permeability $\mu$ varies with the external magnetic field Hex, the voltage standing wave ratio and the pitch $\lambda$ also vary, resulting in a change in the standing wave as indicated by the broken-line curve in FIG. 2. According to the broken-line curve, the standing wave amplitude $|V|$ becomes a voltage Vex at $x=x_0$. Therefore, the external magnetic field Hex can be detected based on the voltage Vex.

The microwave waveguide 2 may be in form of a microwave stripline. The microwave stripline comprises, as shown in FIG. 1, a grounded conductor 5 and a line conductor 6, with a dielectric 7 and the soft magnetic material interposed therebetween.

The soft magnetic material 1 has its magnetic permeability B depending sharply on the applied magnetic field. When the magnetic field is applied in a certain direction, the magnetic permeability of the soft magnetic material 1 increases. As the applied magnetic field increases in intensity, the the magnetic permeability of the soft magnetic material 1 decreases.

The microwave stripline has its load end 2a open. At the other end of the microwave waveguide 2 remote from the load end 2a, the high-frequency oscillator 3 is connected between the grounded conductor 5 and the line conductor 6 through a transmission line 8 which may comprise a coaxial cable.

The microwave waveguide 2 is oscillated by the high-frequency oscillator 3 with a frequency of about 1 GHz, for example, with no signal magnetic field applied. The frequency of the high-frequency oscillator 3 is adjusted so that the standing wave amplitude is minimum at $x=x_0$, as indicated by the solid-line curve in FIG. 2. At $x=x_0$, the standing wave voltage is detected by a detecting circuit 9, and measured by a voltmeter 10.

As shown in FIG. 1, the open load end 2a of the microwave waveguide 2 is positioned closely to the magnetic recording medium 4 in confronting relationship thereto. A leakage magnetic field, i.e., a signal magnetic field, produced by a signal magnetically recorded on the magnetic recording medium 4 is applied as an external magnetic field Hex to the soft magnetic material 1. Since the magnetic permeability $\mu$ of the soft magnetic material 1 changes due to the applied external magnetic field Hex, the voltage standing wave and the standing wave pitch $\lambda$ also vary as indicated by the broken-line curve in FIG. 2. Therefore, the magnetically recorded signal can be read as the voltage change.

When the frequency of the high-frequency oscillator 3, i.e., the carrier frequency f, is selected to be of 1 GHz, for example, even if the signal magnetic field Hex is of a sufficiently high frequency of about 100 MHz, the carrier can be removed by the detecting circuit 9, and only the change in the signal magnetic field Hex can be detected as the voltage change.

The microwave waveguide type magnetic reproducing head can be fabricated by the thin film technology.

However, there is a limitation on the track width of any thin film magnetic heads because of problems in the fabricating process and magnetic characteristics. Consequently, it is necessary to record signals in shorter wavelengths for higher recording density.

Since the MR magnetic head and microwave waveguide type magnetic head, referred to above, are dedicated for reproducing recorded signals, some fabrication problems such as their positioning and structural complexities arise out of combining themselves with recording heads.

OBJECTS AND SUMMARY OF THE INVENTION

It is an object of the present invention to provide a high-density magnetic recording and reproducing head which is composed of a microwave waveguide type reproducing head of simple arrangement capable of reliably reading signals that have been recorded with high density, and a recording head capable of recording signals with high density.

According to the present invention, there is provided a magnetic recording and reproducing head for recording a signal from and reproducing a signal from a magnetic recording medium having a perpendicularly magnetizable film, comprising a magnetic sensing section comprising a slender needle of a soft magnetic material, exciting means for magnetizing the slender needle to record a signal on the magnetic recording medium, and means for applying high-frequency electric energy to the magnetic sensing section to produce a reflected wave, and for detecting a change in the reflected wave caused by a leakage magnetic field produced by a signal recorded on the magnetic recording medium, thereby reproducing the signal recorded on the magnetic recording medium.

The slender needle comprises a tapered, pointed needle-shaped dielectric member and a layer of a soft magnetic material deposited on and around the needle-shaped dielectric member. The exciting means comprises an exciting coil wound around the layer.

The magnetic recording and reproducing head is in the form of a microwave waveguide for reproducing the recorded signal with high sensitivity. The slender needle of the magnetic sensing section has a sharp tip end capable of reproducing the recorded signal with high resolution. The slender needle is also capable of recording a signal with high density.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

The principles of the present invention will be described as being incorporated in a high-density magnetic recording and reproducing head in the form of a microwave waveguide magnetic head for recording signals on and reproducing signals from a magnetic recording medium comprising a perpendicularly magnetizable layer.

Embodiment 1

Figure 3:
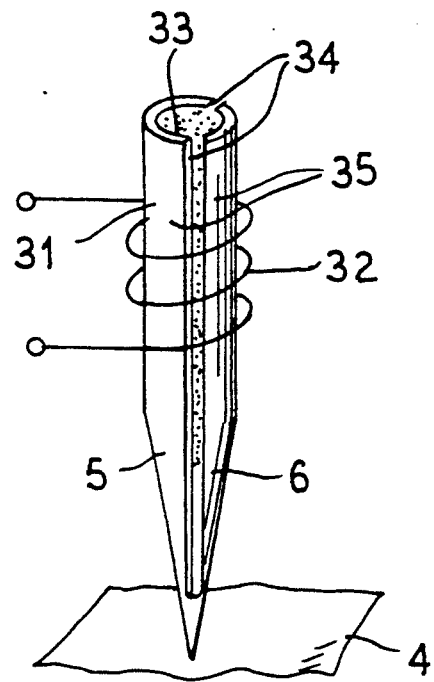
FIG. 3 is a fragmentary perspective view of a magnetic recording and reproducing head according to an embodiment of the present invention.

As shown in FIG. 3, a high-density magnetic recording and reproducing head comprises a slender needle 31 as a magnetic field sensing section which is composed of a tapered, pointed needle-shaped dielectric member 33 produced by melting and drawing a glass rod, and a layer 35 of a soft magnetic material deposited on and around the needle-shaped dielectric member 33 by electroless plating, electric plating, evaporation, sputtering, or the like. The layer 35 has a pair of axial slits 34 which divides the layer 35 into two segments that are connected at tip ends.

The layer 35 whose magnetic permeability varies depending on an external magnetic field applied thereto may be made of an amorphous soft magnetic material such as $Co_{75}Ta_{11}Zr_{14}$, for example.

The layer 35 as it is divided into two segments by the slits 34 is in the form of a microwave waveguide. Specifically, the two divided segments of the layer 35 serve as respective conductors 5, 6 of the microwave waveguide whose load end is short-circuited.

The high-density magnetic recording and reproducing head also includes an exciting coil 32 wound around the slender needle 31.

Figure 5:
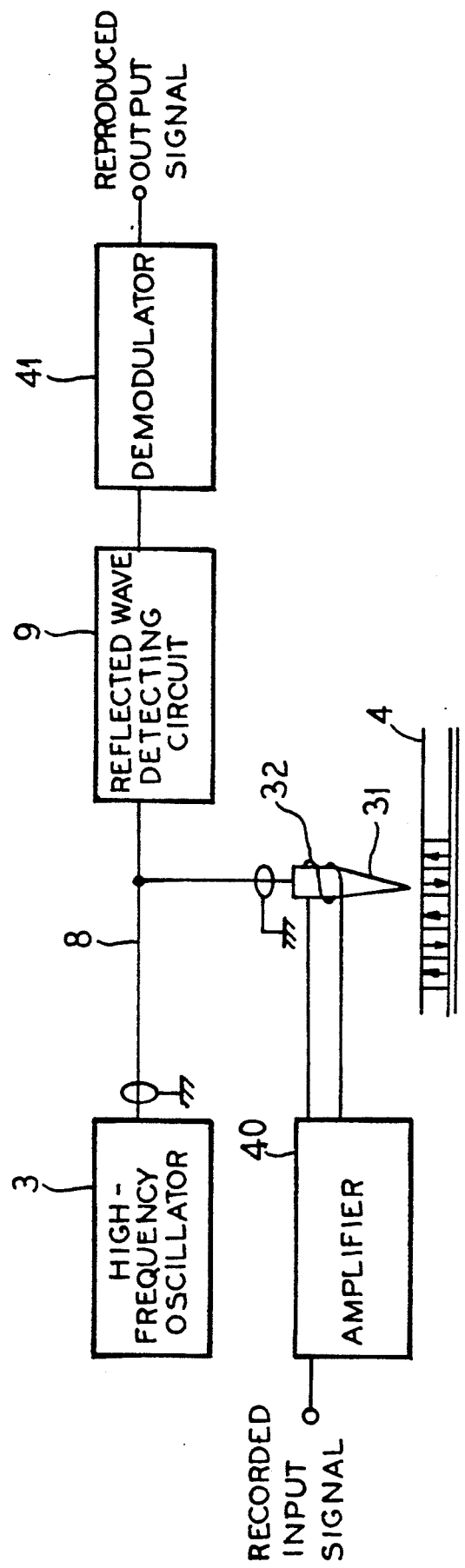
FIG. 5 is a block diagram of a recording and reproducing system employing the magnetic recording and reproducing head according to the present invention.

To record a signal on a magnetic recording medium 4, the tip end of the slender needle 31 is held in contact with or positioned closely to the magnetic recording medium 4 as shown in FIGS. 3 and 5, and the slender needle 31 and the magnetic recording medium 4 are moved relatively to each other. The signal to be recorded is amplified by an amplifier 40, and then applied to the exciting coil 32. The magnetic recording medium 4 is perpendicularly magnetized by a leakage magnetic field that is applied from the tip end of the slender needle 31 depending on the applied signal to be recorded.

If necessary, a counter magnetic pole (not shown) may be positioned in confronting relationship to the slender needle 31 with the magnetic recording medium 4 therebetween, or the magnetic recording medium 4 may have a highly magnetically permeable film deposited on the side of its magnetic film remotely from the slender needle 31, for efficient and stable perpendicular magnetic recording on the magnetic recording medium 4.

To reproduce a signal recorded on the magnetic recording medium 4, the tip end of the slender needle 31 is also held in contact with or positioned closely to the magnetic recording medium 4. A leakage magnetic field produced by the recorded signal on the magnetic recording medium 4 is applied to the slender needle 31, resulting in a change in the magnetic permeability thereof. At the same time, the layer 35 is supplied with high-frequency electric energy from a high-frequency oscillator 3 (FIG. 5) through a transmission line 8 in the form of a coaxial cable, for example.

Figure 1:
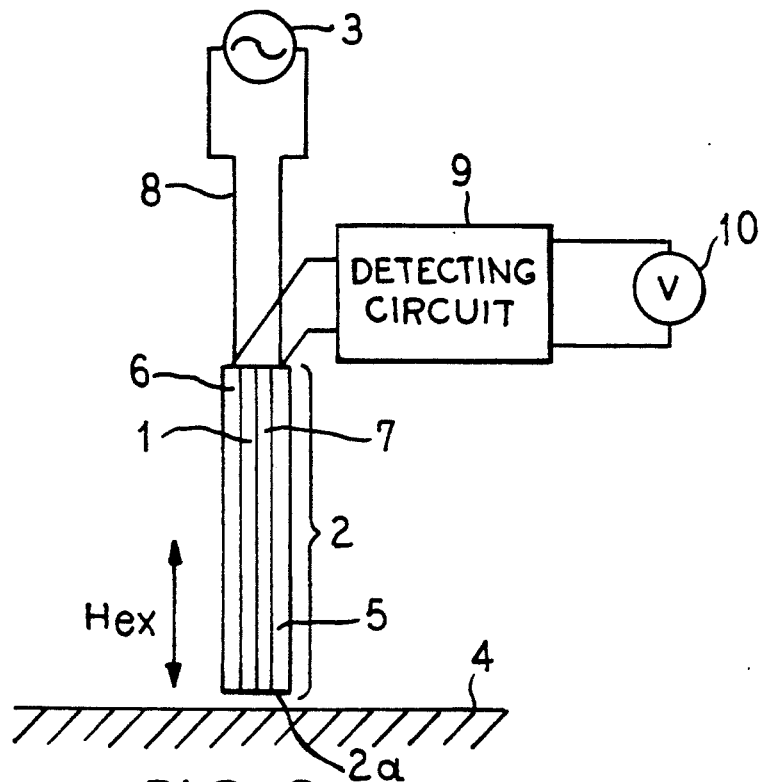
FIG. 1 is a schematic view of a conventional microwave waveguide type magnetic detecting device.
Figure 2:
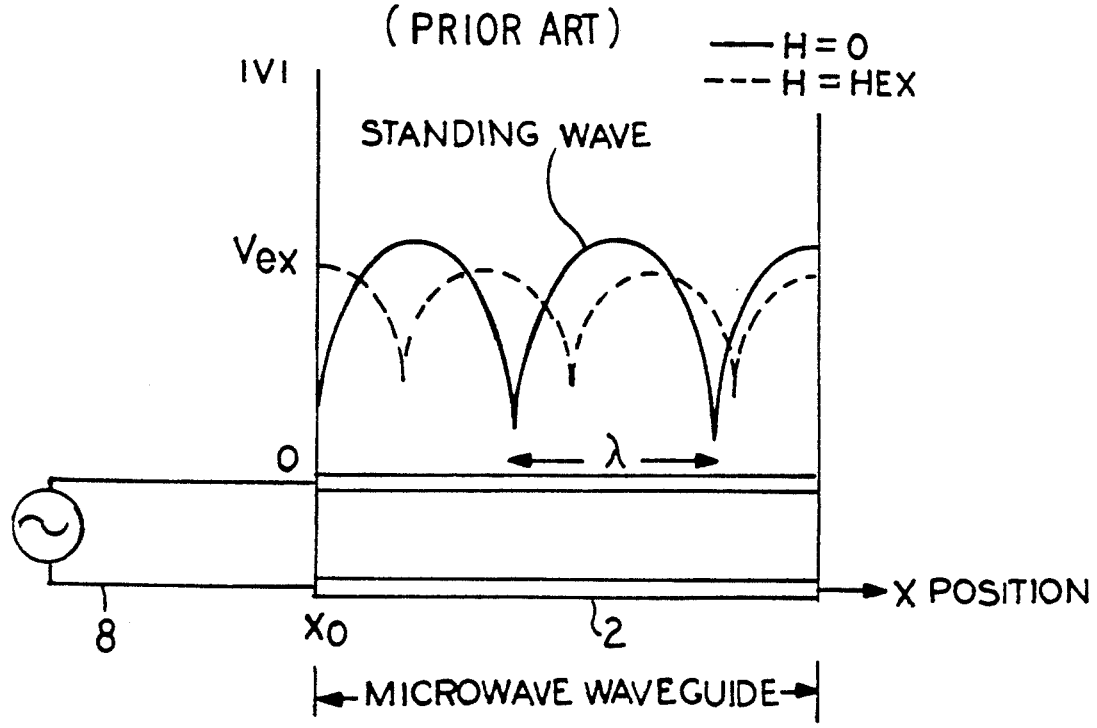
FIG. 2 is a diagram of a standing wave amplitude voltage, illustrative of operation of the microwave waveguide type magnetic detecting device shown in FIG. 1 embodied as a magnetic head.

Under the applied external magnetic field, i.e., the signal magnetic field from the magnetic recording medium 4, the change in the magnetic permeability of the slender needle 31, i.e., the layer 35, results in a change in the reflected wave, i.e., a change in the standing wave as described above with reference to FIG. 2. The change in the standing wave is detected by a detecting circuit 9, and demodulated by a demodulator 41 into a reproduced output signal.

Figure 8:
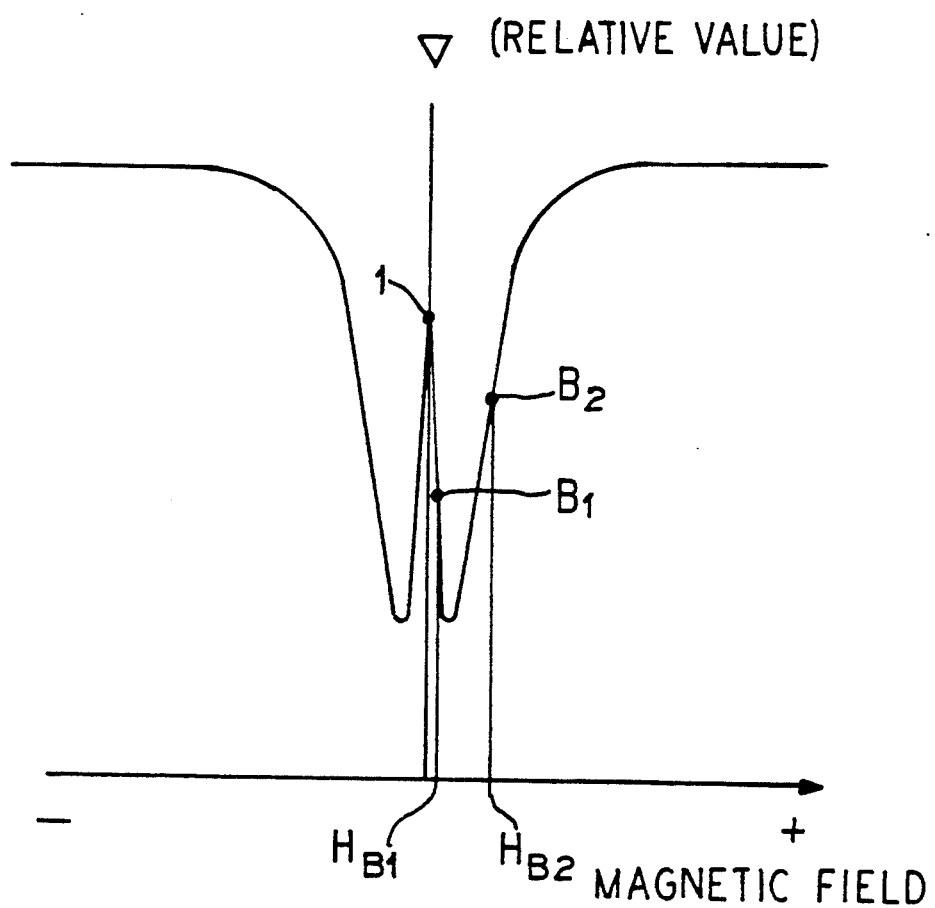
FIG. 8 is a diagram showing the relationship between a magnetic field and an output voltage of the magnetic recording and reproducing head as a microwave waveguide type magnetic head.

As shown in FIG. 8, the reproduced output signal varies in its intensity with respect to the external magnetic field according to essentially the same pattern irrespective of whether the external magnetic field is of a positive or negative value, and the reproduced output signals does not increase monotonously with the external magnetic field. Therefore, in order to obtain a linear reproduced output signal with its polarity reversed depending on the polarity of the external magnetic field, it is preferable to apply a biasing magnetic field $H_{B1}$ or $H_{B2}$ to the slender needle 31 so that an operating point exists at $B_1$ or $B_2$ when the external magnetic field (signal magnetic field) is zero. The biasing magnetic field may be applied by energizing the exciting coil 32.

Embodiment 2

Figure 4:
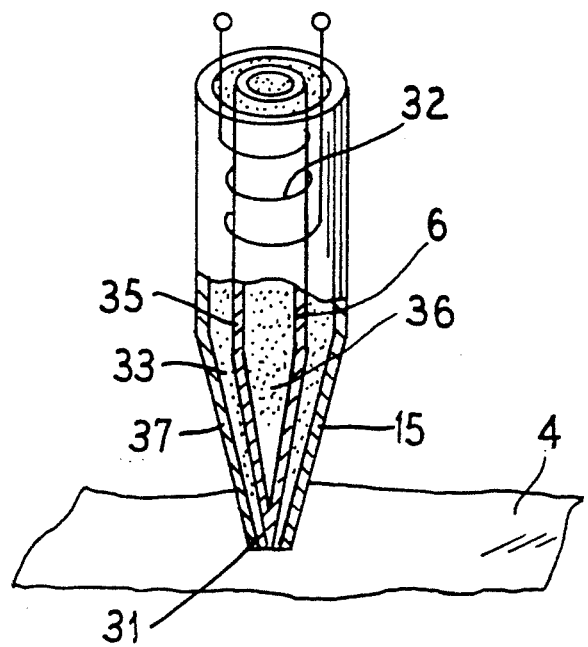
FIG. 4 is a fragmentary perspective view, partly in cross section, of a magnetic recording and reproducing head according to another embodiment of the present invention.

As shown in FIG. 4, a slender needle 31 comprises a tapered, pointed needle-shaped dielectric member 36 produced by melting and drawing a glass rod, and a layer 35 of a soft magnetic material deposited on and around the needle-shaped dielectric member 36. The slender needle 31 itself serves as one conductor 16 or core conductor. An electrically conductive layer 37 is disposed around the core conductor 16 with a dielectric layer 33 interposed therebetween, the electrically conductive layer 37 serving as another conductor 15 or external conductor. The high-density magnetic recording and reproducing head of this structure is in the form of a coaxial microwave waveguide type magnetic head whose load end is open. An exciting coil 32 is wound around the core conductor 16.

Embodiment 3

Figure 6:
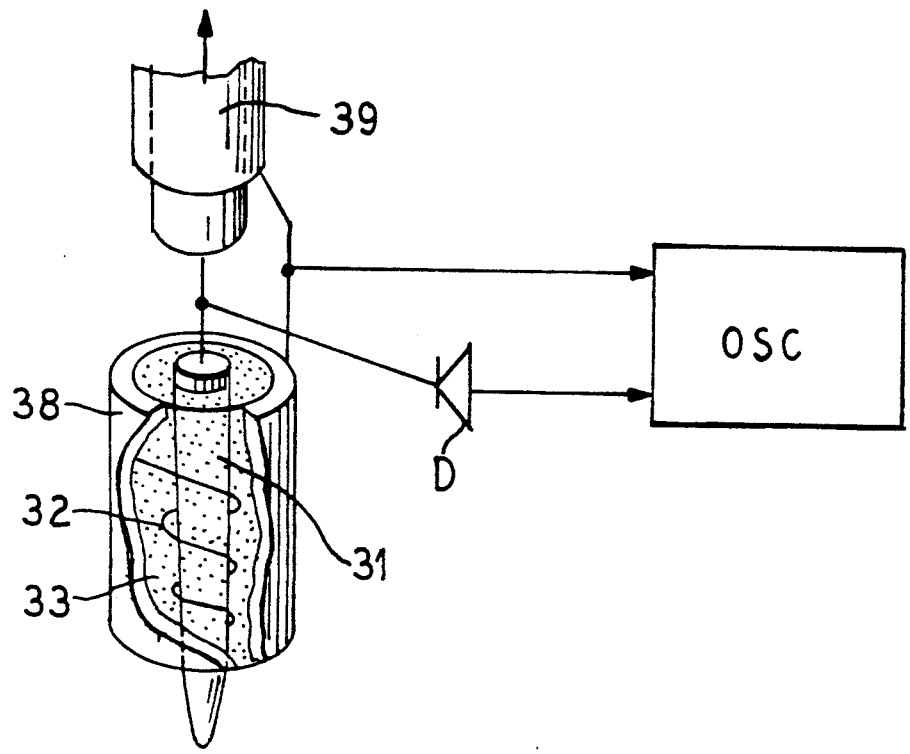
FIG. 6 is a fragmentary perspective view, partly in cross section, of a magnetic recording and reproducing head according to still another embodiment of the present invention.

As shown in FIG. 6, a slender needle 31 is made of CoFeSiB amorphous material. For example, the slender needle 31 shown in FIG. 6 was fabricated as follows: a CoFeSiB amorphous magnetic wire (manufactured by Unitika Ltd.) having a diameter of about 100 $\mu$m, produced according to the water-flow ultra-rapid cooling process, was electrolytically ground in a phosphoric acid into a needle having a tip end whose radius of curvature was about 5 $\mu$m. The sharpened wire was then cut off into a length of about 5 mm for use as the slender needle 31.

Then, a formal-coated copper wire having an outside diameter of 0.03 mm was wound in 30 turns as the exciting coil 32 around the slender needle 31 near its tip end.

The slender needle 31 with the exciting coil 32 is placed in a tubular shield case 38 of copper having an inside diameter of 0.5 mm, and the space therebetween is filled with a dielectric material 33 of epoxy resin.

A core conductor and an external conductor of a coaxial cable 39 are connected respectively to the slender needle 31 and the shield case 38.

In operation, the magnetic head of the above structure is supplied with high-frequency electric energy having a frequency of about 1 GHz or higher from the high-frequency oscillator 3 (see FIG. 5. A detecting diode such as a Schottky barrier diode D is connected between the magnetic head and the coaxial cable 39, and an output signal from the Schottky barrier diode D is applied to an oscilloscope Osc.

Figure 7:
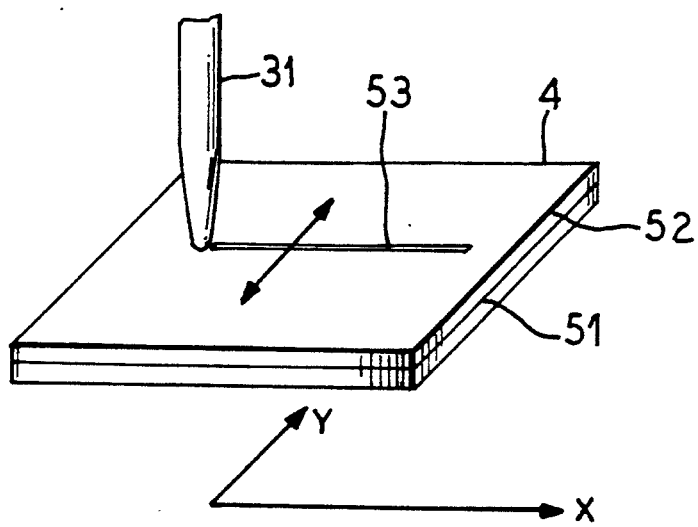
FIG. 7 is a fragmentary perspective view illustrative of a magnetic recording and reproducing process.

Characteristics of the magnetic head shown in FIG. 6 were measured as follows:

As shown in FIG. 7, a magnetic layer 52 in the form of a TbFe amorphous alloy film was sputtered up to a thickness of about 0.2 $\mu$m on a sheet of slide glass 51 having sides each 20 mm long, thus producing a medium 4. The medium 4 was then set on an X-Y stage movable in small intervals along X- and Y-axes that extend perpendicularly to each other along the surface of the medium 4. The magnetic layer of the medium 4 had a coercive force of about 80 kA/m (1000 (Oe)).

The slender needle 31 of the magnetic head was held in contact with the magnetic layer of the medium 4, and then while a direct current of 200 mA was being supplied to the exciting coil 32, the X-Y stage was moved in the direction of the X-axis, thus recording a linear magnetized pattern 53 on the medium 4.

Then, the exciting coil 32 was de-energized, and high-frequency electric energy of about 1 mW having a frequency of about 1 GHz was supplied from the high-frequency oscillator 3 to the coaxial cable 39 while at the same time the X-Y stage was being moved in the direction of the Y-axis across the recorded magnetized pattern 53.

Each time the slender needle 31 moves across the recorded magnetized pattern 53, a signal voltage change of about 1 mV was detected by the diode D, and observed on the oscilloscope Osc. It was confirmed, from the distance traversed by the slender needle 31, that the magnetized pattern 53 recorded on the medium 4 had a width of about 10 $\mu$m.

In the above recording and reproducing example, the medium 4 was magnetized unidirectionally with the direct current. However, it is possible to record an alternating current signal on the medium simply by changing the direction in which the supplied current flows. The recorded alternating current signal may be reproduced with an output signal indicative of magnetizing directions that change each time the polarity of the recorded magnetized pattern is reversed.

Embodiment 4

The magnetic head shown in FIG. 6 and the medium 4 shown in FIG. 7, which are identical to those according to Embodiment 3, were used, and direct currents of reversed polarities of ±200 mA were alternately supplied at intervals of 1 second to the exciting coil 32 while the X-Y stage described with reference to FIG. 7 was being moved in the direction of the X-axis at a speed of 1 mm per second, thus recording a pattern on the medium 4. Then, the magnetic head was returned to the origin on the X-Y stage. While the X-Y stage was being moved at the same speed of 1 mm per second, high-frequency electric energy of about 1 GHz was supplied from the coaxial cable 39 to the magnetic head, and a detected output signal from the diode D was observed on the oscilloscope Osc. At this time, the exciting coil 32 was supplied with a direct current of about 2 mA to apply a biasing magnetic field to the slender needle 31. The produced output signal was of about 1 mV and had its polarity reversed at each interval of 1 second depending on the reversal of polarity of the recording current.

Embodiment 5

The magnetic head shown in FIG. 6 and the medium 4 shown in FIG. 7, which are identical to those according to Embodiment 3, were also used, and a sine-wave current having a frequency of 10 kHz and a maximum value of 200 mA was supplied the exciting coil 32 while the X-Y stage described with reference to FIG. 7 was being moved in the direction of the X-axis at a speed of 1 mm per second, thus recording a pattern on the medium 4. Then, the magnetic head was returned to the origin on the X-Y stage. The recorded pattern on the medium 4 was then traced by the magnetic head under the same conditions as those of Embodiment 4, and a detected output signal from the diode D was observed on the oscilloscope Osc. As with Embodiment 4, the exciting coil 32 was supplied with a direct current of about 2 mA to apply a biasing magnetic field to the slender needle 31. The produced output signal was of a sine-wave output voltage of about 1 mV having a frequency of 10 kHz.

The various parameters referred to in the above embodiments are illustrative only. The number of turns of the exciting coil, the diameters of the wires, the exciting currents, the frequencies of the supplied high-frequency electric energy, the relative speed of movement between the magnetic heads and the mediums, the frequencies of the recorded signals, and other parameters are not limited to the above specific numerical values, and may vary depending on the size and other dimensions and properties of the magnetic head or slender needle 31.

The principles of operation of the magnetic head at the time of reproducing recorded signals are responsive to the magnitude of magnetic fluxes flowing into the slender needle 31, unlike inductive heads which are responsive to a time-dependent change of magnetic fluxes. Therefore, the output voltage of the magnetic head does not depend on the relative speed between the magnetic head and the magnetic recording medium. The magnetic head is thus also capable of reproducing signals recorded on stationary recording mediums.

According to the present invention, since the magnetic head detects a signal magnetic field as a change in the voltage at a certain position in the microwave waveguide based on a change in the standing wave caused by a change in the magnetic permeability of the magnetic member in the microwave waveguide, the magnetic head can reproduce, with high sensitivity, the signal magnetic field produced by signals recorded on the magnetic recording medium irrespective of the relative speed between the magnetic head and the magnetic recording medium, as with the MR magnetic head.

The microwave waveguide configuration of the magnetic head according to the present invention allows its carrier frequency to be increased up to several hundred MHz or even to the order of GHz. Therefore, the magnetic head can record high-frequency signals on the magnetic recording medium. This high-frequency recording capability, together with the independency from the relative speed between the magnetic head and the magnetic recording medium, permits signals to be recorded with high density on the magnetic recording medium.

Since the magnetic head serves as both a recording head and a reproducing head, the overall structure is relatively simple as a magnetic recording and reproducing head. The magnetic sensing section of the magnetic head is in the form of a slender needle whose tip end may be of a diameter of the order of submicrons in practice. This needle configuration is also effective to record signals with high density and reproduce recorded signals with high resolution.

The magnetic sensing section of the magnetic head is relatively simple in structure as it is composed of only the slender needle 31 on which the exciting coil 32 is wound. Therefore, the magnetic head according to the present invention can be manufactured with ease.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. A magnetic recording head for recording a signal on a magnetic recording medium having a perpendicularly magnetizable film, comprising:
   a magnetic sensing section comprising a slender needle of a soft magnetic material;
   exciting means for magnetizing said slender needle to record a signal on the magnetic recording medium as said recording head and said magnetic recording medium are moved relative to each other; and
   wherein said slender needle comprises a tapered, pointed needle-shaped dielectric member and a layer of a soft magnetic material deposited on and 360 degrees around said needle-shaped dielectric member.

2. A magnetic recording head according to claim 1, wherein said exciting means comprises an exciting coil wound around said layer.

3. A magnetic recording head for recording a signal on a magnetic recording medium having a perpendicularly magnetizable film, comprising:
   a magnetic sensing section comprising a slender needle of a soft magnetic material;
   exciting means for magnetizing said slender needle to record a signal on the magnetic recording medium as said recording head and said magnetic recording medium are moved relative to each other;

wherein said slender needle comprises a tapered, pointed needle-shaped dielectric member and a layer of a soft magnetic material deposited on and around said needle-shaped dielectric member, wherein said exciting means comprises an exciting coil wound around said layer, and further including an electrically conductive layer disposed around said magnetic sensing section with a dielectric layer interposed therebetween.

4. A magnetic recording head for recording a signal on a magnetic recording medium having a perpendicularly magnetizable film, comprising:

a magnetic sensing section comprising a slender needle of a soft magnetic material;

exciting means for magnetizing said slender needle to record a signal on the magnetic recording medium as said recording head and said magnetic recording medium are moved relative to each other, and further including a shield case disposed around said magnetic sensing section with a dielectric layer interposed therebetween.

5. A magnetic reproducing head for reproducing a signal recorded on a magnetic recording medium as they are moved relative to each other comprising, a magnetic sensing section comprising a slender needle of a soft magnetic material, means for applying high-frequency electric energy to said magnetic sensing section to produce a reflected wave, and for detecting a change in the reflected wave caused by a leakage magnetic field produced by a signal recorded on the magnetic recording medium, thereby reproducing the signal recorded on the magnetic recording medium, and wherein said slender needle comprises a tapered pointed needle-shaped dielectric member and a layer of soft magnetic material deposited on and 360 degrees around said needle-shaped dielectric member.

6. A magnetic reproducing head according to claim 5 wherein said exciting means comprises an exciting coil wound around said layer.

7. A magnetic reproducing head for reproducing a signal recorded on a magnetic recording medium as they are moved relative to each other comprising, a magnetic sensing section comprising a slender needle of a soft magnetic material, means for applying high-frequency electric energy to said magnetic sensing section to produce a reflected wave, and for detecting a change in the reflected wave caused by a leakage magnetic field produced by a signal recorded on the magnetic recording medium, thereby reproducing the signal recorded on the magnetic recording medium, wherein said slender needle comprises a tapered pointed needle-shaped dielectric member and a layer of soft magnetic material deposited on and around said needle-shaped dielectric member, wherein said exciting means comprises an exciting coil wound around said layer, and further including an electrically conductive layer disposed around said magnetic sensing section with a dielectric layer interposed therebetween.

8. A magnetic reproducing head for reproducing a signal recorded on a magnetic recording medium as they are moved relative to each other comprising, a magnetic sensing section comprising a slender needle of a soft magnetic material, means for applying high-frequency electric energy to said magnetic sensing section to produce a reflected wave, and for detecting a change in the reflected wave caused by a leakage magnetic field produced by a signal recorded on the magnetic recording medium, thereby reproducing the signal recorded on the magnetic recording medium, and further including a shield case disposed around said magnetic sensing section with a dielectric layer interposed therebetween.

* * * * *